United States Patent [19]

Burkett

[11] 4,158,158

[45] Jun. 12, 1979

[54] D.C. CONTROLLER FOR BATTERY POWERED ELECTRIC MOTOR

[76] Inventor: Joseph C. Burkett, 128 McDowell St., Welch, W. Va. 24801

[21] Appl. No.: 931,490

[22] Filed: Aug. 7, 1978

[51] Int. Cl.² .............................................. H02P 7/06
[52] U.S. Cl. ..................................... 318/139; 318/342
[58] Field of Search ............... 318/139, 342, 442, 500, 318/504; 307/48, 50

[56] References Cited

U.S. PATENT DOCUMENTS

| | | | |
|---|---|---|---|
| 3,219,137 | 11/1965 | Appleton | 318/139 |
| 3,809,978 | 5/1974 | Zubris | 318/139 |

*Primary Examiner*—David Smith, Jr.

[57] ABSTRACT

A D.C. series motor for mining and other equipment is powered by batteries which are connected in parallel for low voltage acceleration and in series for high voltage normal running speed. The motor controller includes a relay switch for connecting the batteries in series circuit without opening the parallel battery connections, and uni-directional conductors which prevent short circuiting in the parallel battery circuit legs when the series connection is completed. Forward and reverse circuits for reversing current flow through the motor armature each include normally open relay contacts on opposite sides of the armature. The motor is energized by actuation of a foot controlled sequential switch which first energizes a normally neutral position directional switch and directs current to either a forward direction relay or to a reverse direction relay depending upon the selection of the operator. Energization of the forward or reverse relays closes the relay contacts in the forward or reverse motor circuit respectively. The motor is then energized by the batteries connected in parallel. Further depression of the foot switch energizes a time delay circuit including a relay which is energized after a time delay to connect the batteries in series and thus to supply high voltage to the motor for normal running speed. The time delay circuit includes a pair of parallel connected time delay switches, each having its energizing element in a different one of the forward and reverse relay circuits. One of the time delay switches thus begins timing as soon as one of the forward and reverse relay circuits is energized.

8 Claims, 1 Drawing Figure

4,158,158

D.C. CONTROLLER FOR BATTERY POWERED ELECTRIC MOTOR

BACKGROUND OF THE INVENTION

1. Field of the Invention

This invention relates to an improved motor controller and more particularly to a motor controller for a D.C. series motor by which plural batteries are connected in parallel for motor acceleration, and by which after a time delay the batteries may be connected in series without opening the parallel battery connections for normal running speed.

2. Description of the Prior Art

It is broadly old in the prior art to utilize battery operated series D.C. motors to drive mining and other heavy industrial equipment. In order to prolong the life of the equipment, it is important to gradually bring the motor up to speed. One of the methods utilized in the prior art for accelerating a D.C. series motor is to provide a multiple voltage source of energy and to start the motor at a reduced voltage, then to gradually increase the voltage. A common multiple voltage source includes a plurality of batteries which may be connected variously in parallel and in series in order to place different voltages across the motor, the parallel connection of plural batteries provide a lower voltage than a series connection of the batteries. In the past, the change over from a parallel connection to a series connection has commonly involved opening the parallel battery connections and then closing the series battery connections. The following patent is illustrative of a system of the aforesaid type:

U.S. Pat. No. 3,223,908, Hutchinson et al, Dec. 14, 1965.

A disadvantage of a system which requires mechanical switching to open the parallel circuits before connecting the series circuit is that the system will have substantial current spikes with consequent injurious effect upon the equipment.

More recently an effort has been made to avoid opening the circuit between the motor and its power source when changing from a parallel battery connection to a series battery connection. The following patent discloses a motor control system by which the change over from a parallel battery connection to a series battery connection is made without first opening the parallel battery connection and then closing the series battery connection:

U.S. Pat. No. 3,264,540 Dannettell, Aug. 2, 1966

U.S. Pat. No. 3,264,540 discloses the use of uni-directional conductors to prevent short circuiting the parallel connected batteries when a circuit connecting the batteries in series is closed.

SUMMARY OF THE INVENTION

The present invention relates to a semi-solid state D.C. controller for battery powered motor driven equipment, such as mining and other industrial equipment, to improve the operation of the equipment, to extend battery life, to extend motor life, to reduce the shock on gear trains and thereby to extend the life of the mechanical portion of the equipment.

It is an object of the present invention to provide an improved motor controller for a battery powered series motor which includes means for acceleration of the motor in either a forward or reverse direction of rotation at a reduced voltage obtained by connecting a pair of batteries in parallel, and for running the motor at a higher voltage obtained by connecting the batteries in series without interruption of current to the motor during the transition from parallel to series battery connections, the application of uni-directional conductors being provided to prevent short circuiting the parallel connected batteries when a circuit connecting the batteries in series with each other and with the motor is completed.

The motor controller of this invention will extend battery life because the use of the batteries is equalized. It eliminates high transient current by avoiding the opening of mechanical switches during the transition from parallel battery connections to series battery connections. It further reduces equipment maintenance because of the reduction of mechanical and electrical wear.

It is a further object of this invention to provide a D.C. series motor controller which includes forward and reverse motor circuits for reversing the current flow through the motor armature. Each of the forward and reverse motor circuits includes normally open relay contacts on opposite sides of the armature. The contacts in the forward motor circuit are part of a forward relay having its operating coil in a forward relay control circuit, and the contacts in the reverse motor circuit are part of a reverse relay having its operating coil in a reverse relay control circuit. The forward and reverse relay control circuits are selectively energized through a manual directional control switch. A primary control circuit is provided which is energized by one of the batteries in the system. It includes a foot operated sequential speed switch having a first contact in circuit with the directional control switch and a second contact in a time delay circuit which includes a pair of parallel timer switches in series with the energizing coil of a relay for connecting the batteries in series circuit with each other and with the motor. Each of the timer switches has its energizing element in a different one of the forward and reverse relay control circuits so that energizing either of the forward or reverse relay control circuits initiates the time delay period which is controlled by the timer switches. When the foot operated sequential speed control switch is depressed, it first energizes the directional control switch and, depending upon the direction the operator selects, either the forward or reverse relay control circuit is energized. If the forward direction is selected, the forward relay will be energized, the forward motor circuit will be completed and the motor will be energized by the batteries connected in parallel. If the reverse direction is selected, the reverse relay will be completed and the motor will be energized by the batteries connected in parallel to rotate in the reverse direction. Further depression of the foot operated sequential speed switch closes the time delay circuit which energizes the series connecting relay and connects the batteries in series after one of the two timer switches is closed. The motor then operates at high voltage and at normal running speed.

BRIEF DESCRIPTION OF THE DRAWING

With the foregoing more important objects and features in view and such other objects and features which may become apparent as this specification proceeds, the invention will be understood from the following description taken in conjunction with the accompanying drawing, in which like characters of reference are used to designate like parts, and in which:

The single FIGURE is a schematic diagram of a motor controller in accordance with this invention.

DETAILED DESCRIPTION OF THE PREFERRED EMBODIMENT

Figure 1:
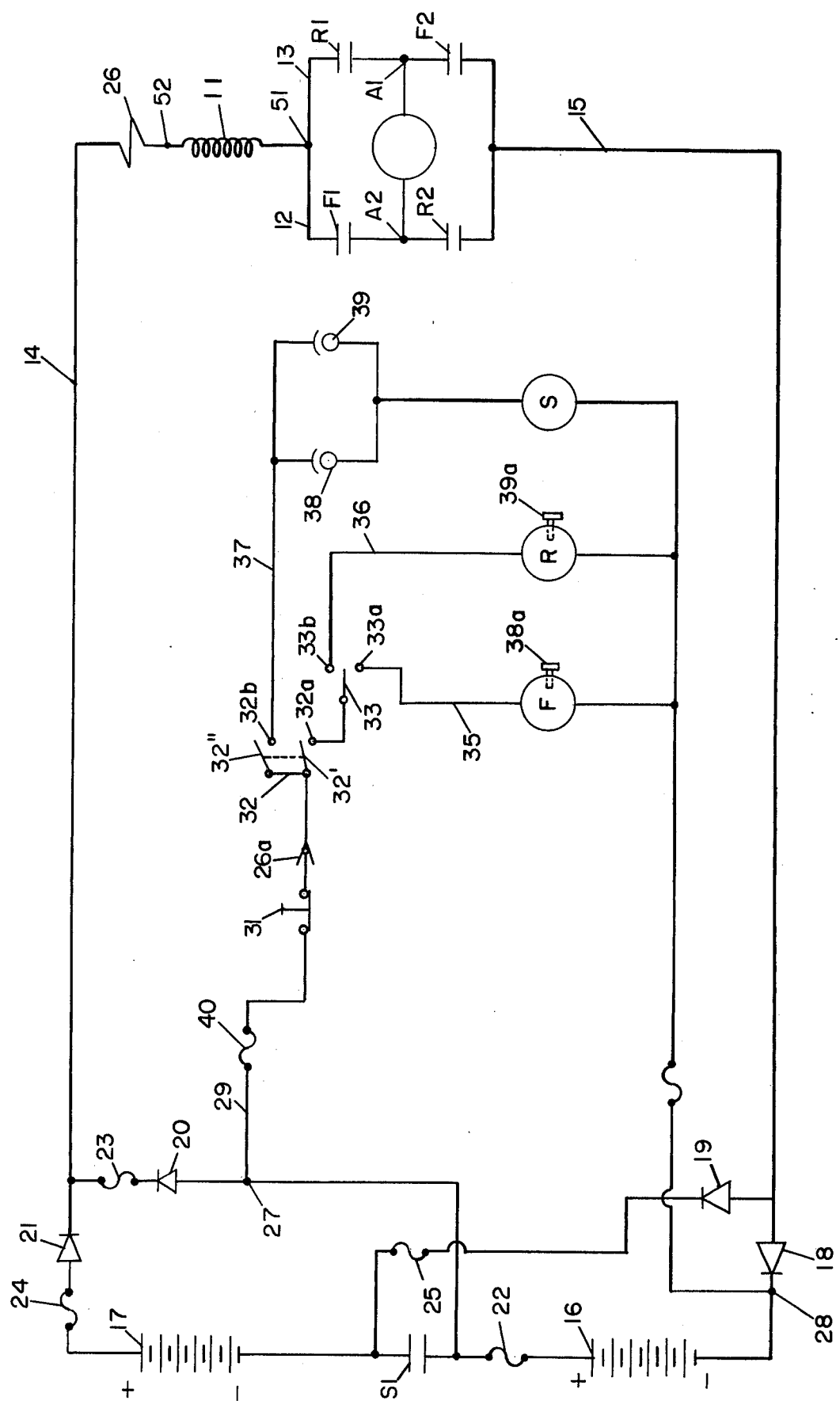

Referring now to the drawing, the reference numeral 10 designates an armature of a series type D.C. motor having a field winding 11. The armature 10 is adapted to be mechanically connected with various load devices, such as heavy machines used in mining, although the mechanical connection and the specific load device are not part of this invention.

The armature 10 is wired to be selectively connected in series with the field winding 11 through either a forward circuit 12 including the relay contacts F1 and F2 located on opposite sides of the armature, or through a reverse circuit 13 including the relay contacts R1 and R2 also located on opposite sides of the armature. The contacts F1 and F2 are normally open and are closed when the forward relay coil F is energized. Similarly the contacts R1 and R2 are normally open and are closed when the reverse relay coil R is energized. The contacts F1 and R1 are connected on one side to terminal 51 of the field winding 11 and on their opposite sides to the armature terminals A2 and A1 respectively. The contacts F2 and R2 are connected on one side to the negative power lead 15 and on their opposite sides to the armature terminals A1 and A2 respectively.

It will be apparent that current can be made to flow in one direction through the armature 10 by closing the forward relay contacts F1 and F2 while the reverse relay contacts R1 and R2 remain open, or in the opposite direction by closing the reverse relay contacts R1 and R2 while the forward relay contacts F1 and F2 remain open. The reversal of direction of rotation of the armature 10 is thereby controlled.

The series motor including the armature 10 and its field 11 is powered by a pair of batteries 16 and 17 connected either in parallel with the motor or in series with the motor through the positive current lead 14 and the negative current lead 15.

The negative lead 15 is connected with the negative terminal of the battery 16 through a uni-directional conductor 18, and to the negative terminal of the battery 17 through a uni-directional conductor 19. The positive current lead 14 is connected to the positive terminal of battery 16 through uni-directional conductor 20 and to the positive terminal of battery 17 through uni-directional conductor 21.

A normally open switch S1 is connected between the positive terminal of battery 16 and the negative terminal of battery 17. The switch S1 is a relay switch which for purposes of identification will be called a series connecting relay.

The power circuit for the motor includes the battery 16 with its associated diodes 18 and 20, the battery 17 with its associated diodes 19 and 21, the positive and negative leads 14 and 15 respectively, the motor armature 10, the series field 11, forward and reverse motor circuits 12 and 13 respectively and the series connecting relay switch S1. Protective fuses 22, 23, 24, and 25 are provided in the power circuit for safety purposes and a current overload relay coil 26 is located in the positive power lead 14 to sense an overload in the motor power circuit and to open the primary motor control circuit subsequently to be described. It will be understood that the motor power circuit is normally open and is not energized until either the forward motor circuit 12 is energizing by closing forward relay contacts F1 and F2, or the reverse motor circuit 13 is energized by closing reverse relay contacts R1 and R2. It will be further understood that with the switch contacts S1 open, the batteries 16 and 17 are parallel connected to supply the series motor with low voltage for starting.

Closing the series connecting relay contacts S1 connects the batteries 16 and 17 in series with each other and with the series motor field 11 and armature 10 without opening the parallel battery connections, and applies full voltage (the sum of the voltages of all the batteries) to the motor. The diodes 19 and 20 will now allow current flow through them because the anode of diode 20 becomes negatively charged and the cathode of diode 19 becomes positively charged.

The leads 29 and 30 of the motor control circuit are connected to the battery 16 at junctions 27 and 28 respectively. The positive lead 29 includes a normally closed push button emergency stop switch 31, and the normally closed contact 26a of the overload relay 26 leading up to a foot operated sequential speed switch 32. The speed switch 32 includes a pair of wiper blades 32' and 32", each connected to the lead 29 which engage fixed contacts 32a and 32b respectively in time sequences as the foot switch is depressed.

The contact 32a is connected to the movable arm of a directional control switch 33 by conductor 34. The directional control switch includes a fixed contact 33a to which the forward relay control circuit 35 is connected, and a fixed contact 33b to which the reverse relay control circuit 36 is connected. The switch 33 is a three-position switch, including the neutral position shown, a forward position in which the blade 33 engages contact 33a and a reverse position in which the blade 33 engages contact 33b. The forward relay control circuit includes the forward relay energizing coil F connected between contact 33a and the negative lead 30. The reverse relay control circuit includes the reverse relay energizing coil R connected between contact 33b and the negative lead 30.

The contact 32b of the foot actuated switch 32 is connected to a time delay circuit 37 which includes a pair of parallel connected timing switches 38 and 39 and the energizing coil S of the series connecting relay whose switch contact S1 is in the motor power circuit between batteries 16 and 17. The timing switches 38 and 39 are mercury timing relays whose energizing elements 38a and 39a are on the forward and reverse relay coils F and R respectively.

Other types of timing relays which are energized and start timing upon the energizing of the forward or reverse relay control circuits 35 and 36 can be substituted for the mercury timing relays 38 and 39. The period of the time delay caused by the switches 38 and 39 can be varied, however, time delay periods of about one and one-half seconds have been found to be satisfactory.

OPERATION

The drawing shows the motor armature 10 at rest and de-energized with all switches and relays in their normal and de-energized condition. The motor is started by an operator moving the directional control switch blade 33 to engage either contact 33a for forward motion of the motor or contact 33b for reverse motion of the motor. None of the circuits are energized, however, until the foot operated sequential speed switch 32 is depressed first engaging the blade 32' with contact 32a, and on further depression of the switch engaging the blade 32″ with contact 32b. Assuming that the operator has moved the directional control switch 33 to the forward position, the forward relay control circuit 35 is energized when the blade 32′ engages the contact 32a. The forward relay F is energized and the forward relay contacts F1 and F2 are closed thereby energizing the forward motor circuit 12 with low voltage from the batteries 16 and 17 connected in parallel. If the directional switch 33 had been moved to the reverse position, the reverse relay control circuit 36 would have been energized upon depression of the foot switch 32 to engage blade 32′ with contact 32a, and the reverse relay contacts R1 and R2 would have been closed. The timing switches 38 and 39 whose energizing elements are on the forward and reverse relay coils F and R respectively begin timing as soon as the coils F or R are energized.

Further depression of the foot switch 32 to engage the blade 32″ with the contact 32b applies positive potential to the time delay circuit 37 and as soon as one of the timing switches 38 and 39 is closed, the series connecting relay S is energized to close the contact S1 between batteries 16 and 17 and to connect the batteries in series with each other and with the motor. The full potential voltage is thereby applied to the motor, and it will run at normal operating speed.

The foot switch 32 is spring biased to its open position, therefore, the motor will be de-energized when the operator removes his foot from the switch.

The batteries 16 and 17 are selected to be of substantially equal voltage and of like characteristics. The motor controller of this invention may be adapted for use with motors of various horse power ratings by the proper selection of components in the power circuit that will have the current carry capacity required by the motor.

The diodes 18 and 21 are installed to protect the batteries 16 and 21 from short circuit overload in the event of failure of diodes 19 and 20.

While in the foregoing there has been described and shown a preferred embodiment of the invention, various modifications and equivalents may be resorted to within the spirit and scope of the invention as claimed.

What is claimed is:

1. A motor controller for a series connected D.C. motor having an armature and field and selectively energized forward and reverse circuits connecting said armature in series with said field so that current flow through said armature may be selectively revereesed to reverse the direction of rotation of said motor comprising,
   first and second batteries,
   circuit means for connecting said first and second batteries in series with said armature and field including a normally open electrically controlled switch connected between opposite terminals of said first and second batteries,
   a first uni-directional conductor connected in series with said first battery and said armature and field and in parallel with said normally open switch and said second battery with the polarity of said first uni-directional conductor opposite that of the second battery,
   a second uni-directional conductor connected in series with said second battery and said armature and field, and in parallel with said normally open switch and said first battery with the polarity of said second uni-directional conductor opposite that of said first battery,
   said first uni-directional conductor and said first battery, and said second uni-directional conductor and said second battery being connected in parallel with said series motor,
   and control means powered by at least one of said batteries for closing said normally open electrically controlled switch upon energization of said control means,
   said control means including a control circuit having an electric actuator means for closing said normally open switch upon energization of said control circuit, an operator controlled switch for energizing said control circuit, time delay means for delaying the energization of said electric actuator means for a predetermined time after said operator controlled switch is closed, and means for selectively energizing one of said forward and reverse circuits of said motor including a directional control switch and forward and reverse relays which are selectively energized by said directional control switch.

2. A motor controller for a D.C. series type motor having an armature and series field winding comprising:
   at least a pair of batteries,
   selectively energized forward and reverse circuits connecting said field in series with said armature so that current flow through said armature may be selectively reversed to reverse the direction of rotation of said motor,
   a pair of power leads of opposite polarity,
   forward and reverse relays, each having an energizing coil and first and second normally open contacts,
   said forward circuit including said first normally open forward relay contacts connected between one side of said series winding and one side of said armature, and said second normally open forward relay contacts connected between the other side of said armature and one of the power leads,
   said reverse circuit including said first normally open reverse relay contacts connected between said one side of said series winding and said other side of said armature and said second normally open reverse relay contacts connected between said one side of said armature and said one power lead,
   said other power lead being connected to said other side of said series field winding,
   separate parallel circuits connecting said batteries in parallel with each other and to said power leads,
   normally open series connecting relay switch means connected between opposite polarity terminals of said batteries for connecting said batteries in series with each other and with said power leads,
   a control circuit for said motor connected across at least one of said batteries including
   a sequential speed switch having first and second contacts and means for connecting one side of said one battery to said first and second contacts in time sequence,
   said first contact of said sequential speed switch being connected to a directional switch, and said second contact of said speed switch being connected to a time delay circuit including a time delay switching means and the energizing coil for said series connecting relay switch means, said directional switch including a first contact in a forward relay control circuit and a second contact in a reverse relay control circuit, and movable contact means for selectively engaging said first and second contacts, said forward relay control circuit including said forward relay energizing coil connected between said first contact of said directional switch and the other side of said one battery, said reverse relay control circuit including said reverse relay energizing coil connected between said second contact of said directional switch and the other side of said one battery, said time delay switching means being responsive to the energizing of either of said forward relay energizing coil or said reverse relay energizing coil to initiate a time delay period after which the time delay switching means closes to permit energizing of said series connecting relay coil upon actuation of said speed control switch to connect the one side of said one battery to said second contact of said speed switch, the energizing of said series connecting relay coil closing said normally open series connecting relay switch means to connect said batteries in series with said motor, and uni-directional conductor means in each of said parallel battery circuits for preventing the short circuiting of said batteries when said series connecting relay means closes to connect said batteries in series.

3. The motor controller of claim 2 wherein said uni-directional conductor means in each of said parallel circuits includes separate diodes connected between each of the battery terminals and said power leads.

4. The motor controller of claim 2 wherein said sequential speed switch is a foot actuated switch, having means for biasing the switch to its normally open position.

5. The motor controller of claim 2 wherein said control circuit includes a normally closed emergency stop switch for de-energizing said control circuit.

6. The motor controller of claim 2 wherein said control circuit includes a normally closed overload relay switch, said relay switch having overload sensing means in circuit with said motor for opening said overload relay switch upon sensing an overload condition in said motor.

7. The motor controller of claim 2 wherein said time delay switching means in said time delay circuit includes a pair of timer switches connected in parallel with each other between the series connecting relay energizing coil and said second contact of said speed switch, one of said timer switches having an energizing element in the forward relay control circuit, and the other timer switch having an energizing element in the reverse relay control circuit, the energizing element of each of said switches operating to close their respective timer switch after a predetermined time period beginning upon the energization of the circuit in which the timer energizing element is located.

8. The motor controller of claim 2 wherein said batteries are of substantially equal voltage and of like characteristics.

* * * * *